Dec. 5, 1961 C. H. JOHNSON ET AL 3,011,750
PIPE SQUEEZING APPARATUS
Filed Aug. 19, 1958 3 Sheets-Sheet 1

INVENTORS
CARL H. JOHNSON
FRANK S. PEARNE
BY
ATTORNEYS

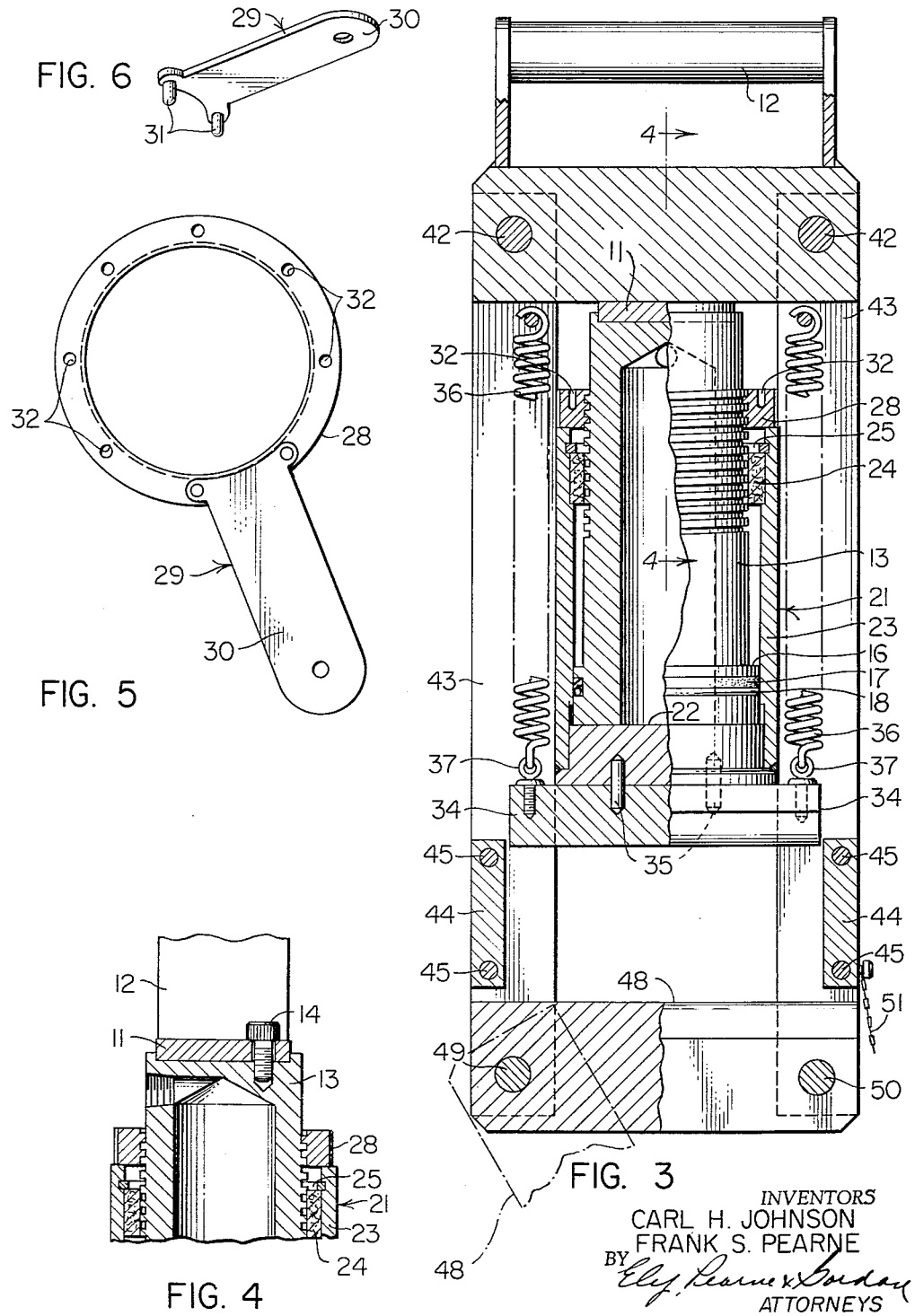

Dec. 5, 1961   C. H. JOHNSON ET AL   3,011,750
PIPE SQUEEZING APPARATUS
Filed Aug. 19, 1958   3 Sheets-Sheet 3
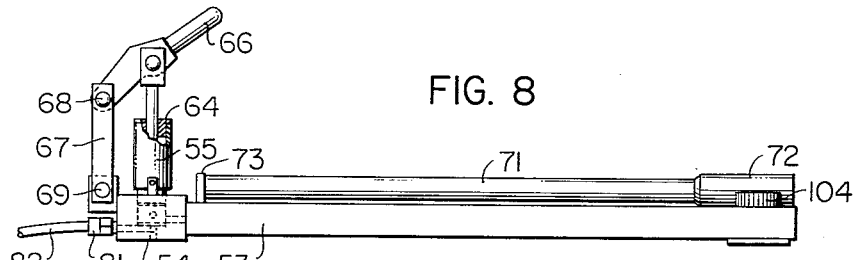
FIG. 8
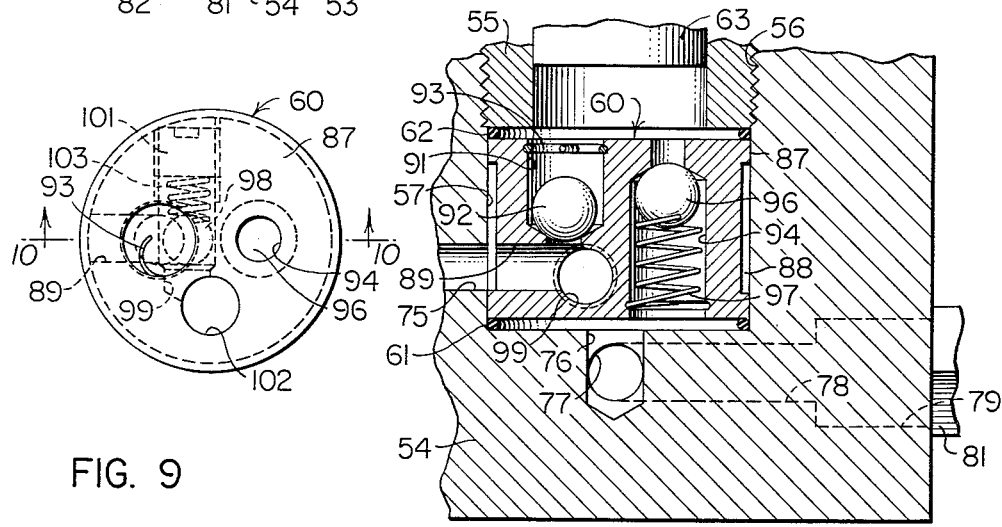
FIG. 9
FIG. 10
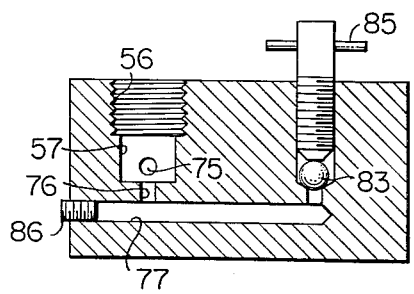
FIG. 12
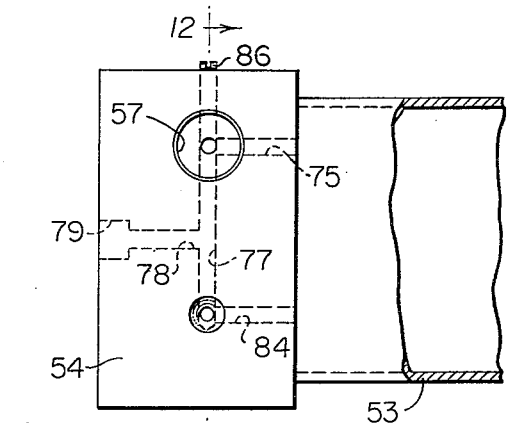
FIG. 11
INVENTORS
CARL H. JOHNSON
FRANK S. PEARNE
BY
ATTORNEYS United States Patent Office 3,011,750
Patented Dec. 5, 1961

3,011,750
PIPE SQUEEZING APPARATUS
Carl H. Johnson, Buena Park, and Frank S. Pearne, Alhambra, Calif., assignors to Regent Jack Mfg. Co., Inc., Downey, Calif., a corporation of California
Filed Aug. 19, 1958, Ser. No. 755,948
4 Claims. (Cl. 251—5)

This invention relates to apparatus for squeezing pipe to collapse it and temporarily cut off the flow of gas or liquid therethrough as an aid in servicing equipment fed by the pipe, or for closing off gas pipe or the like leading to buildings threatened by fire, or for permanently closing abandoned gas and water lines, or for similar purposes. More particularly, the invention relates to easily portable pipe squeezing apparatus comprising a portable pump unit for supplying a hydraulic fluid under high pressure and a portable hydraulic pipe squeezing device connected to and actuated by the pump, the pipe squeezing device being adapted for attachment to a pipe at the point where it is to be collapsed to interrupt flow therethrough.

Devices of the general character described above must exert large squeezing forces in order to collapse conventional iron gas pipe and the like sufficiently completely to cut off all flow therethrough. This requires a pipe unit capable of supplying a hydraulic fluid at pressures up to, say, 10,000 p.s.i. from a suitable reservoir, and a pipe squeezing mechanism capable of safely exerting forces up to, say, 40 tons or more depending upon the size and wall thickness of pipe to be collapsed, all with a substantial factor of safety. How to build such apparatus on a small enough scale so that it may be easily carried about and manipulated by one man and, yet, will be rugged and reliable enough to give long service without requiring disassembly and replacement of overstrained parts, has presented difficult engineering problems.

The objects of the present invention are to provide apparatus of the type described above which overcomes the engineering problems referred to and which can be economically built and assembled; and to provide a design for such apparatus in which all parts that may require replacement are readily accessible so that servicing, when required, is easily and quickly effected.

These objects are accomplished in accordance with the present invention, as more fully disclosed herein with reference to illustrative apparatus embodying the invention. As shown and described, such apparatus may comprise a small, but powerful, hand operated, portable pump unit, that includes a reservoir for a hydraulic fluid to be supplied by the pump under high pressure; and a compact, portable squeezing device that may be quickly applied to the pipe to be collapsed and that may be locked to hold the collapsed pipe wall tightly closed without the necessity for maintaining hydraulic fluid pressure on the squeezing device. A pump unit and squeezing unit may be interconnected by a single length of high pressure flexible hose defining a single conduit through which fluid is supplied from the pump to the squeezing unit and through which fluid may also be returned from the squeezing unit to the reservoir in the pumping unit.

Referring, by way of example, to the accompanying drawings—

FIG. 3 is a front elevational view, partly broken away and shown in section along a central vertical plane.

FIG. 4 is a fragmentary, vertical, sectional view of the structure shown in FIG. 3, taken as indicated by the line 4—4 in FIG. 3.

FIG. 5 is a fragmentary plan view of a locking ring constituting part of the device of FIGS. 1–4 and of an associated wrench which may be applied to the ring for rotating it to securely lock and to unlock the squeezing unit while in a pipe squeezing condition.

FIG. 6 is a perspective view of the wrench shown in FIG. 5.

FIG. 8 is a side elevational view of the pump unit of FIG. 7.

FIG. 9 is a plan view of a unitary valve mechanism employed in the pump unit of FIGS. 7 and 8.

Figure 7:
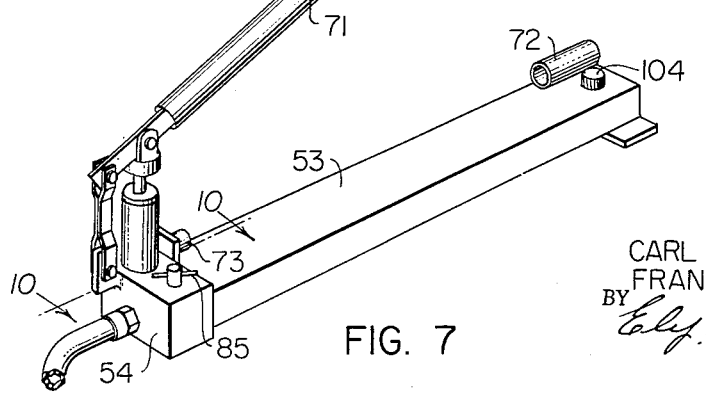
FIG. 7 is a perspective view of a pump unit for supplying hydraulic fluid to the squeezing unit of FIGS. 1–4.

FIG. 10 is a fragmentary, vertical, sectional view of a block at one end of the pump unit of FIGS. 7 and 8 with the unitary valve mechanism of FIG. 9 mounted therein, the section being taken as indicated by the lines 10—10 in FIGS. 7 and 9.

FIG. 11 is a fragmentary plan view of the pump unit of FIGS. 7 and 8 showing a portion of the hydraulic fluid reservoir and the adjoining block at one end thereof, but with the associated pump and valve parts removed for showing how the block may be drilled to receive these associated parts and to provide a conduit system for the flow of hydraulic fluid.

FIG. 12 is a vertical sectional view of the block at one end of the fluid reservoir, taken as indicated by the line 12—12 in FIG. 11 and showing further details as to how the block may be drilled to receive the associated pump and valve parts and to provide the conduit system for the flow of hydraulic fluid, a fluid return valve being shown in place in the block in this view.

Referring first to FIGS. 1 to 6, inclusive, the squeezing unit shown therein may comprise a cross-head 10 having welded thereto a circular plate 11 for holding and positioning a hydraulic piston and cylinder mechanism relative to the cross-head. The cross-head may also have a suitable handle 12 welded thereto for carrying the squeezing unit.

Figure 2:
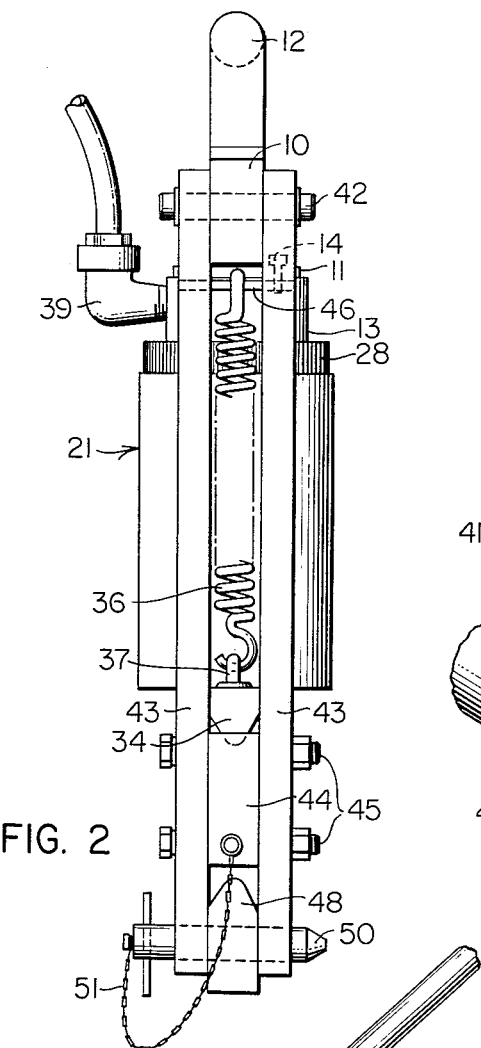
FIG. 2 is a side elevational view of the pipe squeezing unit of FIG. 1.

The piston and cylinder mechanism of the squeezing device may comprise a hollow piston 13 having a closed upper end that is recessed to receive the circular plate 11. The piston may be secured to the circular plate 11 by means of a single cap screw 14 passing through the circular plate and into the closed end of the piston, as shown in FIGS. 2 and 4. The lower end of the piston 13 is open and is provided with an external peripheral flange 16 encircled by a suitable sealing ring 17 and back-up ring 18 seated in a peripheral groove.

A cylinder 21, that is closed at its lower end, is telescoped over the open lower end of the piston 13 for axial sliding movement thereon. The cylinder 21 may suitably comprise a heavy bottom wall 22 welded to a cylindrical shell 23. The upper inner portion of the shell 23 may be recessed to receive a suitable sealing ring 24 held in place by a snap ring 25, the snap ring being seated in an inner circumferential groove in the cylindrical shell and bearing against the upper end of the sealing ring 24.

The piston 13 is externally threaded over a substantial portion of its length, and an internally threaded lock ring 28 is screwed thereon. Rotation of the lock ring 28 may conveniently be effected by hand to cause travel of the lock ring along the piston to and from a locking position in which the lock ring engages the upper end of the cylinder 21. The lock ring may be tightened in its locking position by means of a wrench 29 (FIGS. 1, 5 and 6) having a handle portion 30 and a pair of pins 31 projecting therefrom. The lock ring 28 may be provided with a number of equally spaced apertures 32 drilled into the upper surface thereof entirely around the lock ring for receiving the pins 31 of the wrench 29. The wrench may thus be applied to the lock ring as shown in FIG. 5 for exerting a tightening torque thereon to seat it tightly against the upper end of the cylinder 21 and for loosening the lock nut, as hereinafter described.

An upper jaw member 34, of somewhat greater length than the diameter of the cylinder 21, is removably positioned diametrically across the lower end of the cylinder in any suitable manner, as by dowels 35 (FIG. 3), so that the jaw is held against movement transversely of the axis of the cylinder. The upper jaw member 34 is held in this position against the end wall 22 of the cylinder 21 by means of a pair of helical springs 36 secured thereto by eye bolts 37 threaded into opposite ends of the upper jaw member.

The piston and cylinder mechanism described above is extended by introducing a hydraulic fluid into the hollow piston through a suitable fitting 39 adjacent the upper end thereof. Pressure of the hydraulic fluid over the inner surface of the bottom end 22 of the cylinder 21 forces the cylinder and the upper jaw member 34 axially downwardly against the action of the springs 36. When the pressure of hydraulic fluid is relieved, the springs 36 serve to retract the piston and cylinder mechanism and to raise the upper jaw member 34.

A pair of rigid tension members, generally designated 41 are pivotally connected at their upper ends to the opposite ends of the cross-head 10 by pins 42. As shown, each of these tension members may comprise a pair of spaced bars 43 which straddle the cross-head at their upper ends. A spacer block 44 may be disposed between each pair of bars 41 and bolted thereto by bolts and nuts 45. As shown in FIG. 3, the spacer blocks 44 are located outwardly beyond the opposite ends of the upper jaw member 34 to permit the upper jaw member to move therebetween axially of the piston and cylinder mechanism. The opposite ends of the upper jaw member 34 may thus project a short distance between the pairs of bars 43 of the tension members 41 with a close sliding fit, thus assisting to maintain the tension members 41 parallel with the axis of the piston and cylinder mechanism.

As shown in FIGS. 2 and 3, the upper ends of the springs 36 may be hooked over pins 46 projecting through and bridging the space between the pairs of bars 43 of the tension members 41. As will be best understood from FIG. 3, the springs 36 not only hold the upper jaw member 34 against the lower end of the cylinder 21 with a retracting force on the cylinder 21, but they also provide a small torque yieldably resisting outward swinging movement of the tension members 41 on their mounting pins 42. When disposed in the locations shown, the springs 36 are readily accessible to be hooked and unhooked for assembling and disassembling the squeezing unit, while being more or less enclosed so as not to interfere with easy handling of the assembled unit. Unhooking of the springs 36 permits the upper jaw 34 to be disengaged from the cylinder 21, and this, in turn, permits the cylinder 21 to be withdrawn from the piston 13. Loosening the cap screw 14 then permits the piston 13 to be disconnected from the circular plate 11. As will be apparent, this makes assembling and disassembling of the device a simple matter during initial assembly and also in the event servicing is required.

Figure 1:
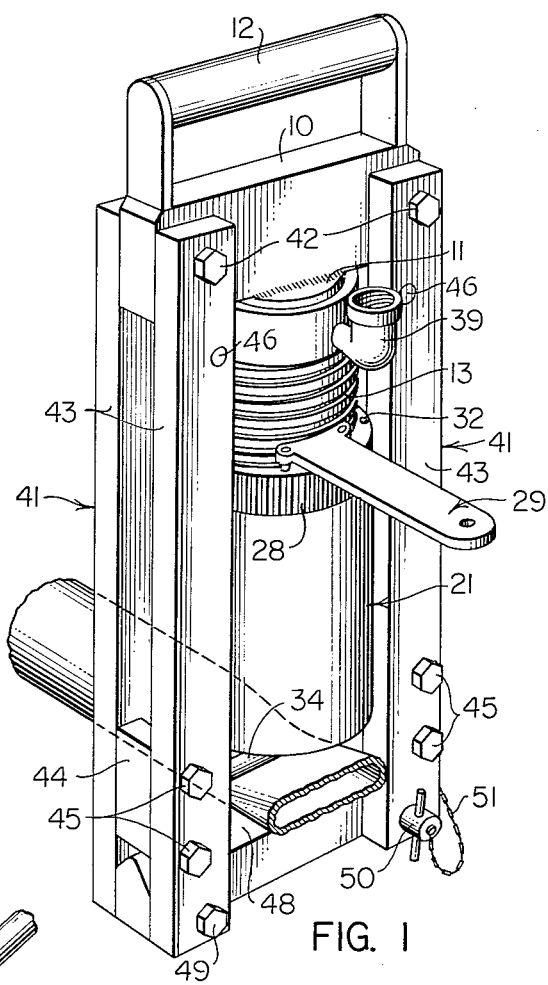
FIG. 1 is a perspective view of a pipe squeezing unit constructed in accordance with the invention.

A lower jaw member 48 has its opposite ends normally disposed between the lower ends of the bars 43 of the tension member 41. At one of its ends, the lower jaw member 48 is pivotally secured to the adjacent tension member by a pivot pin 49 passing through and between the bars 43 of that tension member. The lower jaw member has its opposite end removably secured between the bars 43 of the other tension member 41 by means of a locking pin 50. The locking pin 50 is axially slidable into and out of position for locking and releasing the lower jaw member 48. Accidental loss of the locking pin 50 may conveniently be avoided by connecting it to the squeezing unit by means of a chain 51, suitably secured at one end to the locking pin and at its opposite end to the spacer block 44 of the cooperating tension member 41, as shown in FIGS. 1, 2 and 3. When the locking pin 50 is withdrawn, the lower jaw member 48 will swing about the pivot pin 49 and hang downwardly, as indicated in phantom outline in FIG. 3, enabling the squeezing unit to be applied to a pipe. Thereupon the lower jaw member 48 may be swung back to its normal operating position and the locking pin 50 inserted in place to enclose the pipe between the two jaw members and the two tension members, as shown in FIG. 3.

Supplying hydraulic fluid through the fitting 39 into the piston 13 causes the cylinder 21 and upper jaw member 34 to be moved downwardly against a pipe to which the device has been applied. By supplying the fluid under pressure sufficient for the purpose, the upper jaw member 34 may be forced downwardly toward the lower jaw member 48 to collapse the pipe, as indicated in FIG. 1, until the passageway through the pipe is completely closed. Thereupon the locking ring 28 may be manually screwed downwardly on the piston 13 until it engages the upper end of the cylinder 21. The locking ring may be more forcefully tightened against the upper end of the cylinder 21 by using the wrench 29. Thus, the pressure of hydraulic fluid in the squeezing unit may be relieved, if desired, without relieving the squeezing force on the pipe, whether this occurs accidentally or is intentional in order to remove the pump unit while leaving the squeezing unit in place.

By reason of the construction of the squeezing unit described above, the forces exerted thereby are exerted substantially axially of the device even though the pipe being squeezed is not accurately centered on the axis of the unit, and the various movable parts of the unit maintain themselves substantially in alignment while pipe squeezing forces are being applied. A particular advantage of the relative arrangement of the cross-head 10, tension members 41, and piston and cylinder mechanism straddled thereby is that no radial forces are applied to the cylinder 21 by the cross-head and tension members, which forces would tend to distort the circular cross-section of the cylinder and cause scoring thereof by the piston. As will be apparent from the foregoing description, the device may be easily and quickly applied to a pipe and actuated to collapse the same, and the pipe may be held collapsed indefinitely by the locking ring 28, which is readily accessible for manipulation to lock and unlock the device. The device may be quickly removed from the pipe by loosening the locking ring 28 with the hydraulic fluid pressure in the device relieved, whereupon the springs 36 will cause the piston and cylinder mechanism to remove the force of the jaw members on the pipe, permitting the locking pin 50 to be withdrawn and the device to be removed from the pipe. If the pump unit is attached to the squeezing unit during this operation of removing the squeezing unit from a pipe, as will generally be the case, retraction of the piston and cylinder mechanism will cause the hydraulic fluid therein to flow back through the fitting 39 to the pump unit.

Referring now to FIGS. 7 to 12, inclusive, the pump unit shown therein may comprise an elongated, closed, hollow base 53 serving also as a fluid reservoir, the reservoir having one end closed by a block 54 forming a thick end wall on or in which a pump, valves, and an outlet port may be mounted and in which a suitable conduit system may be provided. A barrel 55 for a hand actuated pump may be threaded into an aperture 56 extending vertically downwardly into the block 54. The aperture 56 may be provided with an inwardly directed shoulder against which the pump barrel may be seated, and the aperture may extend below the shoulder to provide a lower chamber 57 of reduced diameter for receiving a unitary multiple valve mechanism 60. As shown in FIG. 10, the unitary valve mechanism 60 may rest upon an annular gasket 61 of copper or the like, and another similar gasket 62 may be similarly positioned on top of the valve unit whereby both gaskets will be placed under axial compression as the pump barrel 55 is screwed into the aperture 56.

A pump piston 63 may be slidably mounted in the pump barrel 55 and extend out of the upper end thereof through any suitable packing gland 64 to a pivotal connection, at its upper end, with a pump actuating arm 66. The arm 66 may be connected through a link 67 to the block 54 by pivot pins 68 and 69 whereby the pump arm 66 may be moved up and down to cause reciprocation of the pump piston 63 in the pump barrel 55. Actuation of the arm 66 may be facilitated by providing an elongated handle 71 in the form of a tube that may be telescoped over the free end of the arm 66. The handle 71 may conveniently be removed and stored when not in use in suitable holding brackets 72 and 73 mounted on the pump base 53, as shown in FIGS. 7 and 8.

As shown in FIGS. 10–12, hydraulic fluid from the reservoir formed by the pump base 53 may flow into the valve chamber 57 of the block 54 through a horizontal supply passageway 75 leading into the valve chamber through the side wall thereof. Hydraulic fluid under pressure from the pump may flow out of the bottom of the valve chamber 57 through a vertical passageway 76, then through a connecting horizontal passageway 77, and then through a horizontal branch passageway 78 to an outlet port 79. Any suitable fitting 81 (FIG. 8) for a high pressure flexible hose 82 may be connected to the port 79 for flow of hydraulic fluid between the pump unit and the pipe squeezing unit. Hydraulic fluid returned from the pipe squeezing unit to the pump unit through the same hose 82 will flow into the pump unit through the port 79 and branch passageway 78 and into the horizontal passageway 77, from which it will be returned to the reservoir through a manually operated fluid return valve 83 and a horizontal return passageway 84. The fluid return valve 83 may be of any suitable type adapted to be opened and closed by a handle 85. As will be apparent, the several fluid passageways in the block 54 may be drilled into the block from the exterior surfaces thereof, the outer end of the passageway 77 being closed by a plug 86 threaded therein.

The unitary valve 60, shown in detail in FIGS. 9 and 10, may comprise a generally cylindrical body 87 having its cylindrical side wall relieved to provided a broad, shallow, peripheral groove defining a peripheral fluid passageway 88 extending entirely around the valve body. Fluid flowing to the valve body from the reservoir through the horizontal passageway 75 enters the peripheral passageway 88, from which it flows into a horizontal passageway 89 in the valve body 87. This horizontal passageway intersects a vertical passageway 91 containing a ball type check valve 92 retained therein by a snap ring 93. The check valve 92 is held closed by pump pressure during downward movement of the pump piston 63 but is free to move upwardly for opening the vertical passageway 91 when the pump piston 63 moves upwardly to draw fluid from the reservoir into the pump barrel 55.

A vertical passageway 94 in the valve body 87 is normally held closed by a spring loaded ball type check valve 96 which will open in response to pump pressure against the force of a weak spring 97 to permit fluid to be forced by the pump through the vertical passageway 94 and into the vertical passageway 76 in the block 54, and thence through the horizontal passageway 77, branch passageway 78, and port 79 to the hose 82 leading to the pipe squeezing unit.

A safety pressure relief valve 98 of the spring loaded ball type may be seated in a horizontal passageway 99 drilled horizontally into the valve body through the intersection of the horizontal and vertical passageways 89 and 91 therein. The horizontal passageway 99 is closed at its outer end by a plug 101 threaded therein and extends into the lower end of a third vertical passageway 102 in the valve body 87. This third vertical passageway 102 opens upwardly into communication with the pump barrel 55. When excessive pressure is developed in the pump barrel, fluid may flow downwardly through the third vertical passageway 102 and then horizontally in the passageway 99 past the safety valve 98 against its spring loading, and thence back to the reservoir through the horizontal passageway 89 in the valve body, the peripheral passageway 88, and the horizontal passageway 75 in the block 54. The maximum pressure at which the safety valve 88 will open for this purpose may be fixed at any desired value by a stiff spring 103 by which the safety valve 98 is normally held closed. The spring 103 is backed up by the plug 101 that closes the outer end of the passageway 99.

As will be apparent from the foregoing description of the unitary valve mechanism 60, it may simply be dropped into the valve chamber 57 and need not be oriented therein in any particular manner. The peripheral passageway 88 about the valve body maintains communication at all times between the horizontal passageway 75 in the block 54 and the horizontal passageway 89 in the valve body 87, regardless of the orientation of the valve body about its axis. The space between the bottom of the valve body 87 and the bottom of the valve chamber 57, maintained by the lower O-ring 61, insures communication between the vertical passageway 94 in the valve body and the vertical passageway 76 in the block 54.

From the foregoing description of the pump unit, it will be understood that the pump, of the positive displacement type, may be manually manipulated to draw fluid from the reservoir past the check valve 92 into the pump barrel 55 and to positively force the fluid on the downward pressure stroke of the pump past the spring loaded check valve 96 through the conduit system in the block 54 and the hose 82 to the pipe squeezing unit. All danger of overstraining any parts of the pump unit is avoided by the safety pressure relief valve 98 which operates in response to the development of excessive pressure by returning fluid back to the reservoir. The return valve 83, which is closed during operation of the pump unit, may be manually opened to permit fluid from the pipe squeezing unit to be returned through the same hose 82 and through the return valve 83 back to the fluid reservoir. To permit free flow of hydraulic fluid out of and back into the reservoir when operating as described, the pump reservoir may have its fluid charging opening normally closed by a removable plug 104 having a small breather opening (not shown) therein, whereby air may be admitted into the reservoir to replace fluid withdrawn therefrom and air may be exhausted from the reservoir to permit free flow of fluid back into the reservoir from the pipe squeezing unit.

From the foregoing description of the present invention as a whole, it will be readily apparent that numerous modifications thereof may be made within the scope of the invention as defined in the appended claims.

Having described our invention, we claim:

1. A portable pipe squeezer comprising a piston and cylinder mechanism extensible axially in response to supply of hydraulic fluid thereto, a first jaw member mounted diametrically across one end of said mechanism relative to the axis thereof for movement axially therewith as it is extended and retracted, a cross-head mounted diametrically across the opposite end of said mechanism relative to the axis thereof for relative movement toward and away from said first jaw member as said mechanism is retracted and extended, rigid tension members pivotally secured to opposite ends of said cross-head for pivoting thereon diametrically of said mechanism relative to the axis thereof, said tension members normally being disposed symmetrically relative to the axis of said mechanism and extending axially thereof beyond said first jaw member, a second jaw member, means for pivotally securing opposite ends of said second jaw member to said tension members beyond said first jaw member with the second jaw member parallel to said cross-head in axial alignment therewith and with said mechanism, and coacting means on said first jaw member and tension members slidably connecting the same for relative axial movement while holding the first jaw member parallel to said cross-head, whereby said cross-head, tension members, and second jaw member are pivotally connected in a parallelogram configuration and said first jaw member is restrained for relative movement axially of the mechanism in parallelism with said cross-head and second jaw member.

2. A pipe squeezer according to claim 1 including a pair of spring means, each connecting one end of said first jaw member to a fixed point on the adjacent tension member between the first jaw member and the cross-head, said spring means being biased to cause retraction of said mechanism upon relief of fluid pressure therein and being oriented to resist outward swinging movement of said tension members relative to the axis of the mechanism.

3. A pipe squeezer according to claim 1 in which each of said tension members comprises a pair of spaced longitudinally extending elements defining a guideway therebetween for said first jaw member.

4. A pipe squeezer according to claim 1 including a pair of spring means, each connecting one end of said first jaw member to a fixed point on the adjacent tension member between the first jaw member and the cross-head, said spring means being biased to cause retraction of said mechanism upon relief of fluid pressure therein and being oriented to resist outward swinging movement of said tension members relative to the axis of the mechanism, each of said tension members comprising a pair of spaced longitudinally extending elements defining a guideway therebetween for said first jaw member, the spring means being attached to said tension members respectively between said spaced elements thereof.

References Cited in the file of this patent

UNITED STATES PATENTS

| | | |
|---|---|---|
| 316,048 | Mayo | Apr. 21, 1885 |
| 2,098,548 | Kick | Nov. 9, 1937 |
| 2,150,262 | Brittain | Mar. 14, 1939 |
| 2,246,348 | Coffey | June 17, 1941 |
| 2,254,084 | Nilson | Aug. 26, 1941 |
| 2,289,597 | Seat | July 14, 1942 |
| 2,708,882 | Nilson | May 24, 1955 |